United States Patent
Ishikawa et al.

(10) Patent No.: US 8,311,089 B2
(45) Date of Patent: Nov. 13, 2012

(54) MULTI-VIEW VIDEO COMPRESSION CODING METHOD AND APPARATUS

(75) Inventors: Akio Ishikawa, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 1553 days.

(21) Appl. No.: 11/808,818

(22) Filed: Jun. 13, 2007

(65) Prior Publication Data

US 2007/0291850 A1    Dec. 20, 2007

(30) Foreign Application Priority Data

Jun. 14, 2006  (JP) .................................. 2006-164927

(51) Int. Cl.
*H04B 1/66* (2006.01)
(52) U.S. Cl. ........................................ 375/240; 341/110
(58) Field of Classification Search .................. 375/240, 375/240.01
See application file for complete search history.

(56) References Cited

U.S. PATENT DOCUMENTS

| | | | |
|---|---|---|---|
| 6,441,864 B1 * | 8/2002 | Minami et al. ................. | 348/584 |
| 7,035,453 B2 * | 4/2006 | Liu ................................ | 382/154 |
| 2003/0202592 A1 * | 10/2003 | Sohn et al. ...................... | 375/240.16 |
| 2006/0023066 A1 * | 2/2006 | Li et al. .......................... | 348/159 |
| 2006/0023782 A1 * | 2/2006 | Cai et al. ........................ | 375/240.03 |
| 2008/0130738 A1 * | 6/2008 | Lee et al. ....................... | 375/240.01 |

FOREIGN PATENT DOCUMENTS

JP       2005-260464 A    9/2005

OTHER PUBLICATIONS

Yongtae Kim; Efficient disparity vector coding for multiview sequences; Nov. 19, 2003; Yonsei University, Seoul 120-749, South Korea; pp. 539-553.*

* cited by examiner

*Primary Examiner* — Andy Rao
*Assistant Examiner* — Monjour Rahim
(74) *Attorney, Agent, or Firm* — Westerman, Hattori, Daniels & Adrian, LLP

(57) ABSTRACT

A plurality of cameras is placed so that those optical axes become parallel to the Z-axis and are in relative position t on the XY plane. Multi-view video compression coding apparatus determines depth distance Z and unit normal vector (nx, ny, nz) of the arbitrary point in the surface of the object, moves the first block by disparity vector based on t and Z, transforming the first block by linear transformation matrix based on t, Z and n, then, matching the first block to block of the second picture. Then, while changing Z and n arbitrarily, the second block of the second picture which is most similar to the first block is searched for. And the apparatus derives a prediction error between the first block and the second block, codes the prediction error, and adds Z and n to coded data.

20 Claims, 10 Drawing Sheets

MULTI-VIEW VIDEO COMPRESSION CODING METHOD AND APPARATUS

PRIORITY CLAIM

The present application claims priority from Japanese Patent Application No. 2006-164927 filed on Jun. 14, 2006, which is incorporated herein by reference.

BACKGROUND OF THE INVENTION

1. Field of the Invention

The present invention relates to a multi-view video compression coding method and apparatus.

2. Description of the Related Art

"Multi-viewpoint image" means pictures shot at the same time by cameras located at different places. Also, "multi-view video" means time-continuation in these multi-viewpoint images. There is strong correlation between these multi-viewpoint images, except in the difference of the disparity. According to Japanese Patent Laid-Open No. 2005-260464, when these multi-viewpoint images are considered to be a series of pictures, it can be coded by using a motion compensation (a disparity compensation).

"Block matching" is a typical method in the disparity compensation between multi-viewpoint images. Detection of a disparity vector using "block matching" is carried out as follows.

The first camera shoots a first picture as a first viewpoint, and the second camera shoots a second picture as a second viewpoint. The first picture is split into small blocks. The first block in the first picture is moved in the second picture. And the second block having the highest similarity is searched for. Specifically, the first block and the second block minimize absolute error or squared error. Then, a distance between the second block and the first block is calculated as a disparity vector. A prediction error between the first block and the second block is coded, and the disparity vector is added to the coded data.

An object in the first picture is moved in the second picture, and the blocks are matched. That is to say, complete block matching is realized only when the surface of the object becomes vertical to the optical axes of the cameras.

However, when the surface of the object inclines to the optical axes of the cameras, the picture shot for that surface is different for each camera. That is to say, even if the first block of the first picture is moved in the second picture, it cannot search for the second block that is completely matched in the first block. That is because, the shape of the object in the first picture is different from the shape of the object in the second picture; they are projections.

BRIEF SUMMARY OF THE INVENTION

It is therefore an object of the present invention to provide multi-view video compression coding method and apparatus that complete block matching is enabled even if the surface of the object inclines to optical axes of cameras.

According to the present invention, a method for making a computer to function as multi-view video compression coding device, using first picture of an object shot by first camera and second picture of an object shot by second camera, the first camera and the second camera being placed so that those optical axes become parallel to the Z-axis and are in relative position (tx, ty, 0) on the XY plane, the method has:

first step of selecting an arbitrary point on the object, second step of deriving first picture coordinate (x, y) obtained by projecting the arbitrary point in the first picture, and second picture coordinate (x', y') obtained by projecting the arbitrary point in the second picture, third step of selecting first block including the arbitrary point for the first picture, fourth step of determining depth distance Z of the arbitrary point, and unit normal vector (nx, ny, nz) of the arbitrary point in the surface of the object, fifth step of moving the first block by disparity vector based on relative position (tx, ty, 0) and depth distance Z, assuming the first picture coordinate (x, y) as origin, transforming the first block by linear transformation matrix based on relative position (tx, ty, 0), depth distance Z, unit normal vector (nx, ny, nz) and the second picture coordinate (x', y'), then, matching the first block to block of the second picture, sixth step of repeating the fourth step and the fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), and seventh step of deriving a prediction error between the moved and deformed first block of P-picture and the second block of the I-picture which is most similar to the first block, and then, coding the prediction error, and eighth step of adding the depth distance Z and the unit normal vector (nx, ny, nz) to coded data.

It is preferred that the seventh step uses the prediction error coding system of MPEG, the first picture is P-picture, and the second picture is I-picture.

It is also preferred that the first step further selects an arbitrary point on the object for part except the first block in the first picture, and finally all parts of the first picture and the second picture are compression coded.

It is also preferred that, for the first step, the picture coordinate of the arbitrary point is normalized image coordinate, for the fifth step, the disparity vector is as follows;

$$\begin{pmatrix} -\dfrac{t_x}{Z} \\ -\dfrac{t_y}{Z} \end{pmatrix}$$

and the linear transformation matrix is as follows.

$$\begin{pmatrix} \dfrac{t_x n_x}{Z(n_x x' + n_y y' + n_z)} + 1 & \dfrac{t_x n_y}{Z(n_x x' + n_y y' + n_z)} \\ \dfrac{t_y n_x}{Z(n_x x' + n_y y' + n_z)} & \dfrac{t_y n_y}{Z(n_x x' + n_y y' + n_z)} + 1 \end{pmatrix}$$

It is also preferred that the method precedes the first step in case optical axes of first camera and/or second camera may not be parallel to the Z-axis, the method having the step of converted camera coordinate system coordinates of the first camera and the second camera so that these optical axes of the first camera and the second camera become parallel to the Z-axis by using camera internal parameters.

According to the present invention, a multi-view video compression coding method for using first picture of an object shot by first camera and second picture of an object shot by second camera, the first camera and the second camera being placed so that those optical axes become parallel to the Z-axis and are in relative position (tx, ty, 0) on the XY plane, the method has:

first step of selecting an arbitrary point on the object, second step of deriving first picture coordinate (x, y) obtained by projecting the arbitrary point in the first picture, and second picture coordinate (x', y') obtained by projecting the arbitrary point in the second picture, third step of selecting second block including the arbitrary point for the second picture, fourth step of determining depth distance Z of the arbitrary point, and unit normal vector (nx, ny, nz) of the arbitrary point in the surface of the object, fifth step of moving the first picture by disparity vector based on relative position (tx, ty, 0) and depth distance Z, assuming the first picture coordinate (x, y) as origin, transforming the first picture by linear transformation matrix based on relative position (tx, ty, 0), depth distance Z, unit normal vector (nx, ny, nz) and the second picture coordinate (x', y'), then, matching the first picture to the second block of the second picture, sixth step of repeating the fourth step and the fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), seventh step of deriving a prediction error between the moved and deformed first block of P-picture and the second block of the I-picture which is most similar to the first block, and then, coding the prediction error, and eighth step of adding the depth distance Z and the unit normal vector (nx, ny, nz) to coded data.

It is preferred that the seventh step uses the prediction error coding system of MPEG, the first picture is I-picture, and the second picture is P-picture.

It is also preferred that the first step further selects an arbitrary point on the object for part except the first block in the first picture, and finally all parts of the first picture and the second picture are compression coded.

It is also preferred that, for the first step, the picture coordinate of the arbitrary point is normalized image coordinate, for the fifth step, the disparity vector is as follows;

$$\begin{pmatrix} -\frac{t_x}{Z} \\ -\frac{t_y}{Z} \end{pmatrix}$$

and the linear transformation matrix is as follows.

$$\begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix}$$

It is also preferred that the method precedes the first step in case in a case that optical axes of first camera and/or second camera may not be parallel to the Z-axis, the method having the step of converted camera coordinate system coordinates of the first camera and the second camera so that these optical axes of the first camera and the second camera become parallel to the Z-axis, by using camera internal parameters.

According to the present invention, a multi-view video compression coding apparatus connected to a plurality of video cameras placed in different positions, using first picture of an object shot by first camera and second picture of an object shot by second camera, the first camera and the second camera being placed so that those optical axes become parallel to the Z-axis and are in relative position (tx, ty, 0) on the XY plane, the apparatus has:

first unit for determining an arbitrary point on the object, second unit for deriving first picture coordinate (x, y) obtained by projecting the arbitrary point in the first picture, and second picture coordinate (x', y') obtained by projecting the arbitrary point in the second picture, third unit for selecting first block including the arbitrary point for the first picture, fourth unit for determining depth distance Z of the arbitrary point, and unit normal vector (nx, ny, nz) of the arbitrary point in the surface of the object, fifth unit for moving the first block by disparity vector based on relative position (tx, ty, 0) and depth distance Z, assuming the first picture coordinate (x, y) as origin, transforming the first block by linear transformation matrix based on relative position (tx, ty, 0), depth distance Z, unit normal vector (nx, ny, nz) and the second picture coordinate (x', y'), then, matching the first block to block of the second picture, sixth unit for repeating the fourth step and the fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), and seventh unit for deriving a prediction error between the moved and deformed first block of P-picture and the second block of the I-picture which is most similar to the first block, and then, coding the prediction error, and eighth unit for adding the depth distance Z and the unit normal vector (nx, ny, nz) to coded data.

It is also preferred that the seventh unit uses the prediction error coding system of MPEG, the first picture is P-picture, and the second picture is I-picture.

It is also preferred that the first unit further selects an arbitrary point on the object for part except the first block in the first picture, the apparatus further has ninth unit for repeating from first unit to eighth unit, and finally all parts of the first picture and the second picture are compression coded.

It is also preferred that, for the first unit, the picture coordinate of the arbitrary point is normalized image coordinate, for the fifth unit, the disparity vector is as follows; and $$\begin{pmatrix} -\frac{t_x}{Z} \\ -\frac{t_y}{Z} \end{pmatrix}$$

the linear transformation matrix is as follows.

$$\begin{pmatrix} \dfrac{t_x n_x}{Z(n_x x' + n_y y' + n_z)} + 1 & \dfrac{t_x n_y}{Z(n_x x' + n_y y' + n_z)} \\ \dfrac{t_y n_x}{Z(n_x x' + n_y y' + n_z)} & \dfrac{t_y n_y}{Z(n_x x' + n_y y' + n_z)} + 1 \end{pmatrix} \quad 5$$

It is also preferred that in a case that optical axes of first camera and/or second camera may not be parallel to the Z-axis, the apparatus has unit for converting camera coordinate system coordinates of the first camera and the second camera so that these optical axes of the first camera and the second camera become parallel to the Z-axis, by using camera internal parameters.

According to the present invention, a multi-view video compression coding apparatus connected to a plurality of video cameras placed in different positions, using first picture of an object shot by first camera and second picture of an object shot by second camera, the first camera and the second camera being placed so that those optical axes become parallel to the Z-axis and are in relative position (tx, ty, 0) on the XY plane, the apparatus has:

first unit for selecting an arbitrary point on the object, second unit for deriving first picture coordinate (x, y) obtained by projecting the arbitrary point in the first picture, and second picture coordinate (x', y') obtained by projecting the arbitrary point in the second picture, third unit for selecting second block including the arbitrary point for the second picture, fourth unit for determining depth distance Z of the arbitrary point, and unit normal vector (nx, ny, nz) of the arbitrary point in the surface of the object, fifth unit for moving the first picture by disparity vector based on relative position (tx, ty, 0) and depth distance Z, assuming the first picture coordinate (x, y) as origin, transforming the first picture by linear transformation matrix based on relative position (tx, ty, 0), depth distance Z, unit normal vector (nx, ny, nz) and the second picture coordinate (x', y'), then, matching the first picture to the second block of the second picture, sixth unit for repeating the fourth step and the fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), seventh unit for deriving a prediction error between the moved and deformed first block of P-picture and the second block of the I-picture which is most similar to the first block, and then, coding the prediction error, and eighth unit for adding the depth distance Z and the unit normal vector (nx, ny, nz) to coded data.

It is also preferred that the seventh unit uses the prediction error coding system of MPEG, the first picture is I-picture, and the second picture is P-picture.

It is also preferred that the first unit further selects an arbitrary point on the object for part except the first block in the first picture, the apparatus further has ninth unit for repeating from first unit to eighth unit, and finally all parts of the first picture and the second picture are compression coded.

It is also preferred that, for the first unit, the picture coordinate of the arbitrary point is normalized image coordinate, for the fifth unit, the disparity vector is as follows; and $$\begin{pmatrix} -\dfrac{t_x}{Z} \\ -\dfrac{t_y}{Z} \end{pmatrix}$$

the linear transformation matrix is as follows.

$$\begin{pmatrix} \dfrac{t_x n_x}{Z(n_x x' + n_y y' + n_z)} + 1 & \dfrac{t_x n_y}{Z(n_x x' + n_y y' + n_z)} \\ \dfrac{t_y n_x}{Z(n_x x' + n_y y' + n_z)} & \dfrac{t_y n_y}{Z(n_x x' + n_y y' + n_z)} + 1 \end{pmatrix}$$

It is also preferred that in a case that optical axes of first camera and/or second camera may not be parallel to the Z-axis, the apparatus has unit for converting camera coordinate system coordinates of the first camera and the second camera so that these optical axes of the first camera and the second camera become parallel to the Z-axis, by using camera internal parameters.

According to the multi-view video compression coding method and apparatus of the present invention, complete block matching is enabled even if the surface of the object inclines to the optical axes of the cameras. A disparity vector is detected by block matching, and multi-viewpoint images are compression-coded by using the disparity vector.

According to the block matching based on MPEG, first block of the P-picture or I-picture itself is moved and transformed, based on arbitrary depth distance Z and arbitrary unit normal vector n for the surface of a object. Thereby, a linear transformation matrix is detected with a disparity vector. Also, the first picture coordinate is considered to be an origin, and a block transformed based on the linear transformation matrix is derived. Then, a prediction error between these blocks is derived. Thereby, the data volume of the prediction error is reduced, and the multi-viewpoint image is compression-coded with high efficiency.

DETAILED DESCRIPTION OF THE INVENTION

Figure 1:
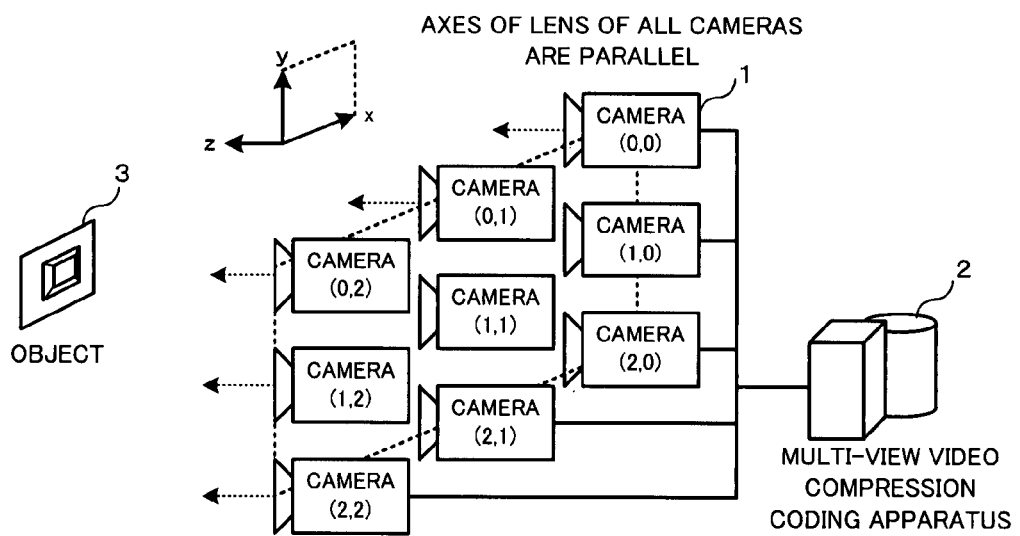
FIG. 1 shows a system configuration diagram of the present invention.

FIG. 1 shows a system configuration diagram of the present invention.

Figure 2:
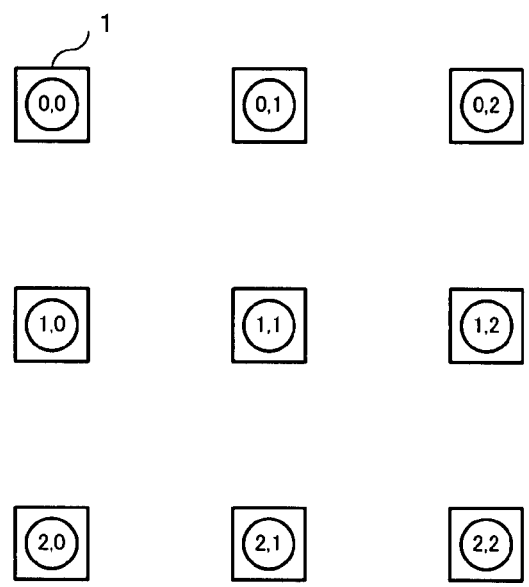
FIG. 2 shows a layout of a plurality of cameras viewed from the front, for a system configuration in FIG. 1.

FIG. 2 shows a layout of a plurality of cameras viewed from the front, for a system configuration in FIG. 1.

A plurality of camera 1 placed in different positions shoots an object 3. Camera 1 is placed so that the optical axis becomes parallel to in the Z-axis. Further, camera 1 is placed on the XY plane that is vertical to the optical axis. According to FIG. 1, nine cameras are placed by in 3 lines and rows by even intervals (viewpoint (0,0)-(2,2)). Also, a plurality of camera 1 is connected to a multi-view video compression coding apparatus 2. According to the present invention, multi-viewpoint images shot by at least two cameras are needed.

Camera 1 sends a captured image of object 3 to multi-view video compression coding apparatus 2. Here, when camera 1 is movable, position information of camera is also sent to multi-view video compression coding apparatus 2. Of course, multi-view video compression coding apparatus 2 may previously store position information of all cameras.

Figure 3:
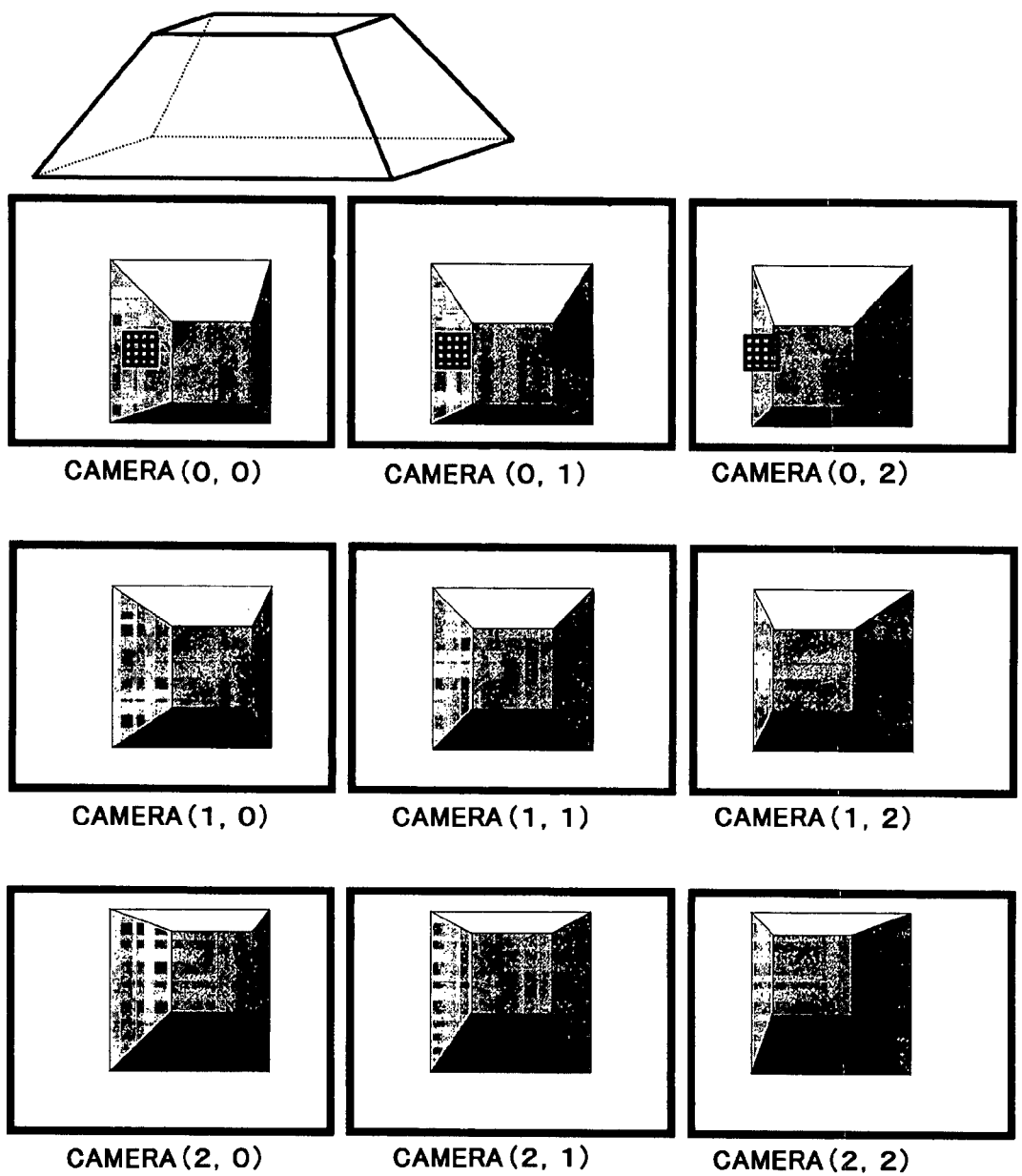
FIG. 3 shows a picture of an object viewed from each camera.

FIG. 3 shows the picture of an object viewed from each camera.

According to FIG. 3, an object is a truncated pyramid. Camera (1,1) is located in the upper direction of the object. Then, according to the picture viewed from camera (1,0) on the left side of camera (1,1), the left side of the object expands, and the right side shrinks. Also, according to the picture viewed from camera (1,2) on the right side of camera (1,1), the left side of the object shrinks, and the right side expands.

Likewise, according to the picture viewed from camera (0,1) on the upper of camera (1,1), the upper of the object expands, and the bottom shrinks. According to the picture viewed from camera (2,1) on the bottom of camera (1,1), the upper of the object shrinks, and the bottom expands.

Figure 4:
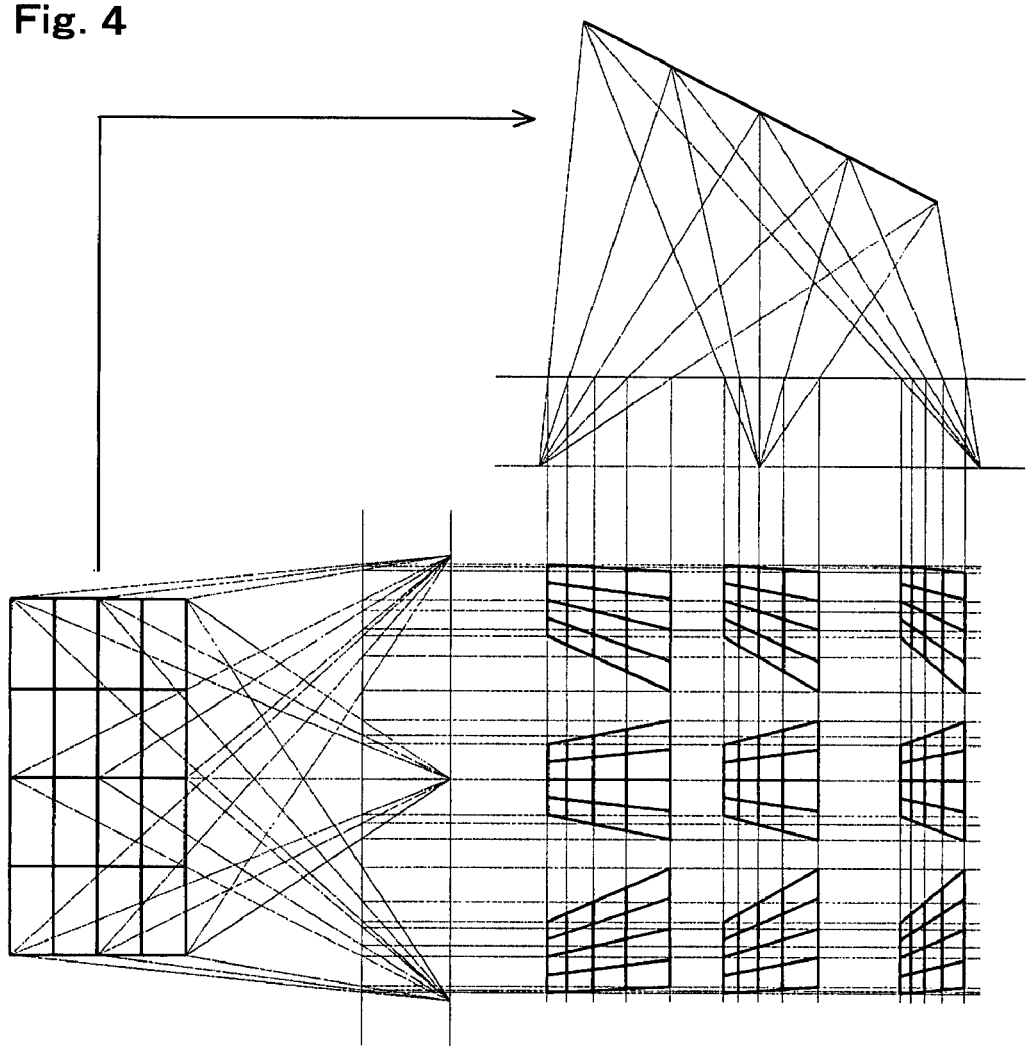
FIG. 4 shows a picture viewed from each camera when the surface of the object is inclined in a transverse direction.
Figure 5:
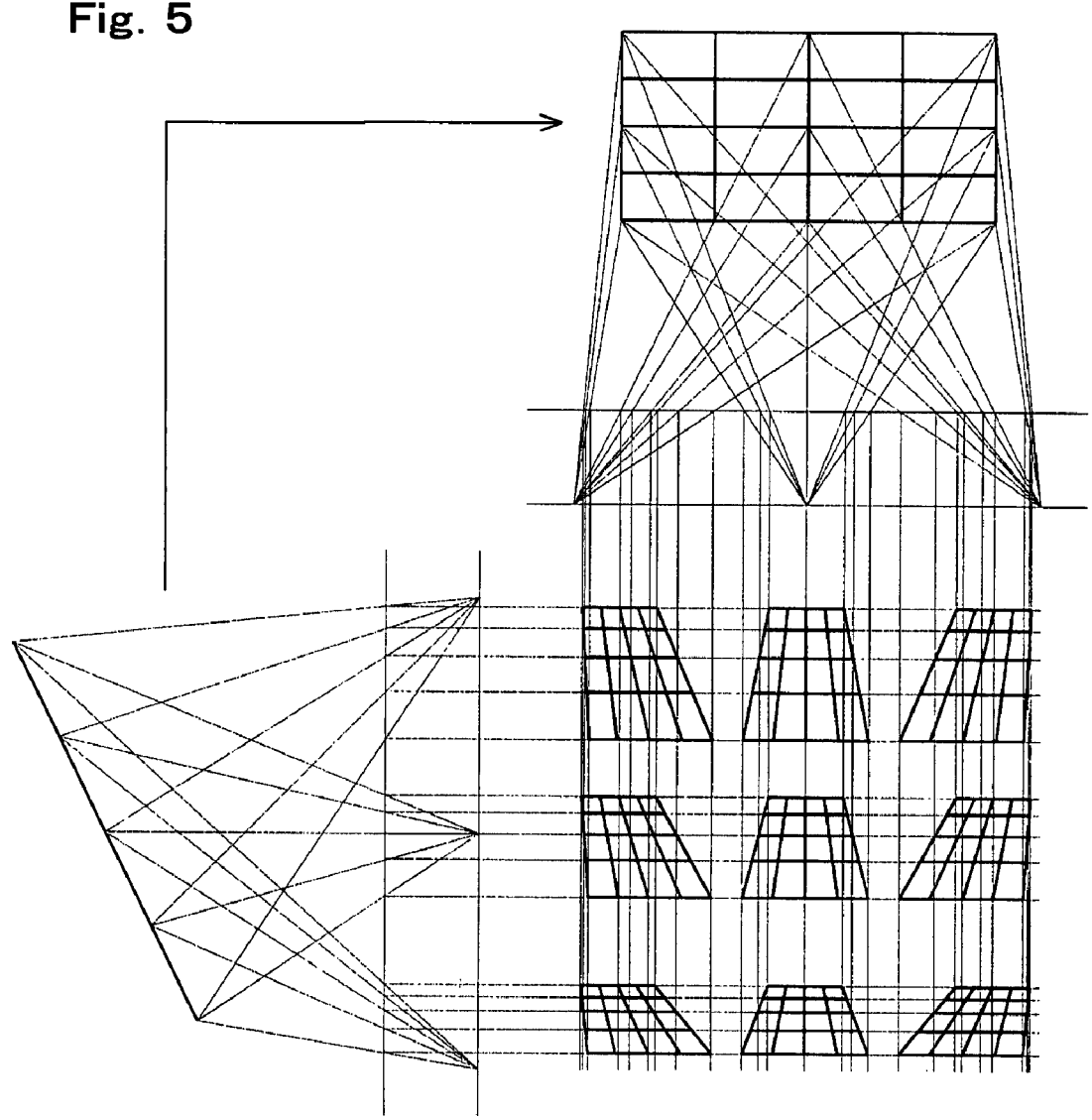
FIG. 5 shows a picture viewed from each camera when the surface of the object is inclined to the top/bottom direction.
Figure 6:
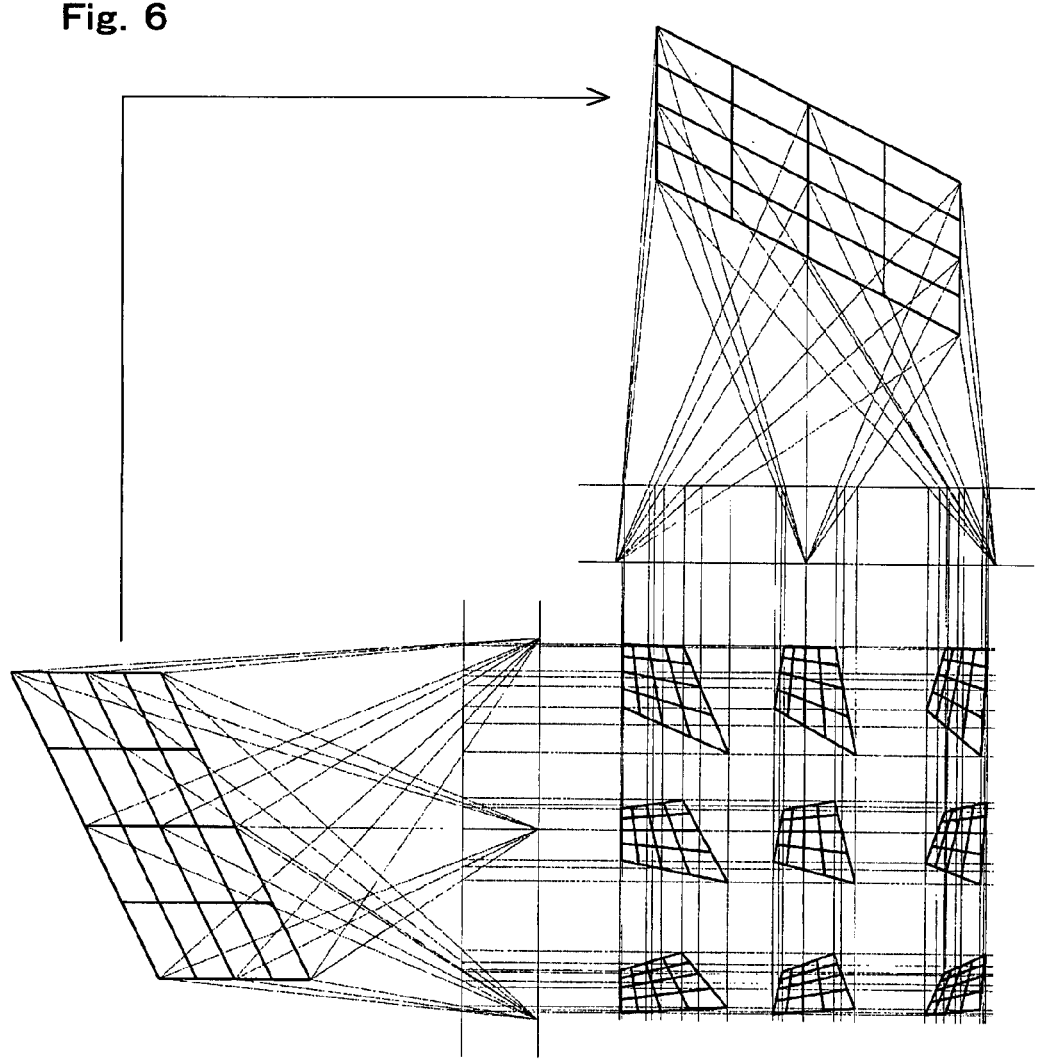
FIG. 6 shows a picture viewed from each camera when the surface of the object is inclined in a transverse direction and is inclined to the top/bottom direction.

FIG. 4-FIG. 6 shows pictures shot by each camera based on inclination in the surface of the object.

FIG. 4 shows a picture viewed from each camera when the surface of the object is inclined to a transverse direction.

According to the object, left side of the object is in the back, and the right side of the object is in the front. Here, the plane of the picture of camera (1,0) on the left side of the camera (1,1) expands than the plane of the picture in camera (1,1).

Also, the plane of the picture of camera (1,2) on the right side of the camera (1,1) is narrower than the plane of the picture of camera (1,1).

FIG. 5 is a picture viewed from each camera when the surface of the object is inclined to the top/bottom direction.

According to the object, left side of the object is in the back, and the right side of the object is in the front. Here, the plane of the picture of camera (0,1) in the upper part of camera (1,1) expands than the plane of the picture of camera (1,1). Also, the plane of the picture of camera (2,1) below the camera (1,1) is narrower than the plane of the picture of camera (1,1).

FIG. 6 shows a picture viewed from each camera when the surface of the object is inclined to a transverse direction and is inclined to the top/bottom direction. That is to say, the inclination in FIG. 4 and the inclination in FIG. 5 are combined.

The difference in pictures in FIG. 3-FIG. 6 is produced, because the sides of the truncated pyramid of the object incline to the optical axes of a plurality of cameras. According to the present invention, even if the surface of the object inclines to the optical axis of camera, the second block completely matching to the first block can be searched for.

Figure 7:
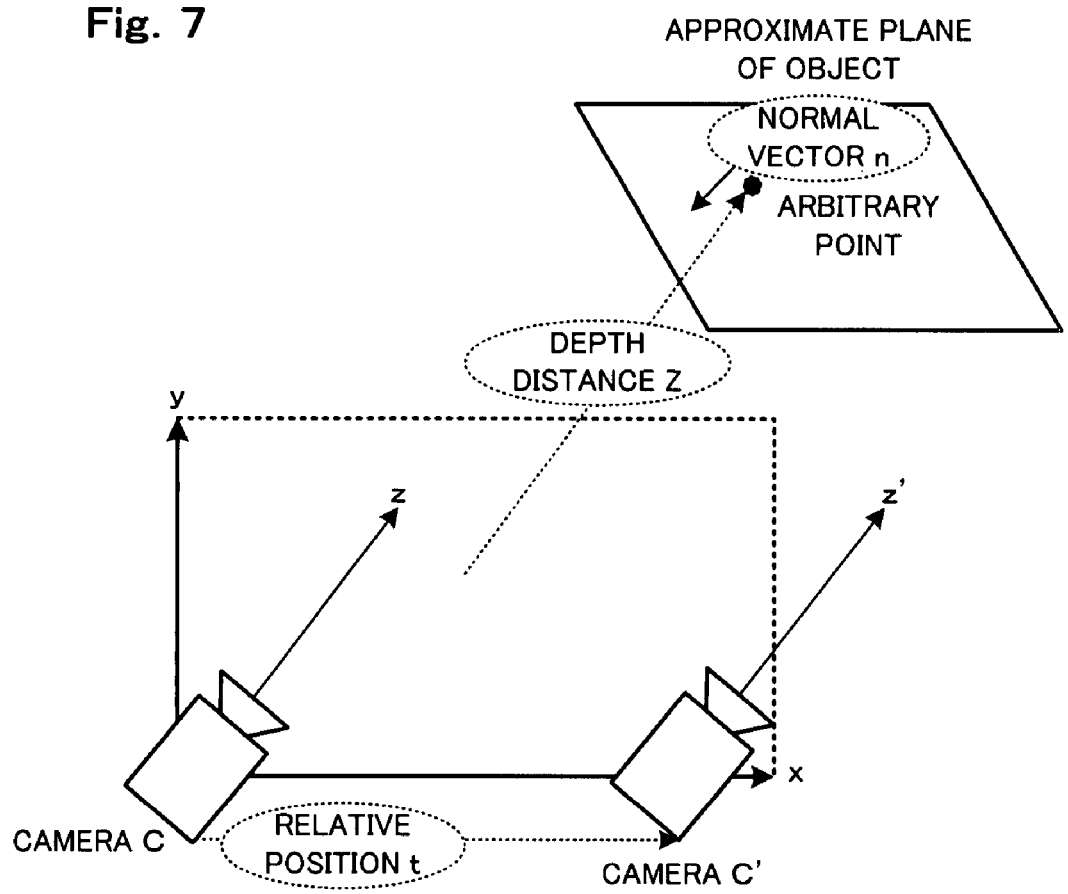
FIG. 7 shows coordinate system in the positional relation of two cameras.

FIG. 7 shows coordinate system in positional relation of two cameras.

Since the object is not a plane in general, the deformation of the block also becomes non-linear. However, when the block looked for is small enough, the aspect of the object in the block can approach in flat. Also, optical axes of two cameras are parallel.

Further, two cameras are placed in relative position (tx, ty, 0) on the same plane which is vertical to the optical axis. The present invention uses depth distance Z and unit normal vector n as parameters of block matching. Depth distance Z means distance from the approximate plane to the arbitrary point of the object. Also, unit normal vector n means direction of the approximate plane.

Figure 8:
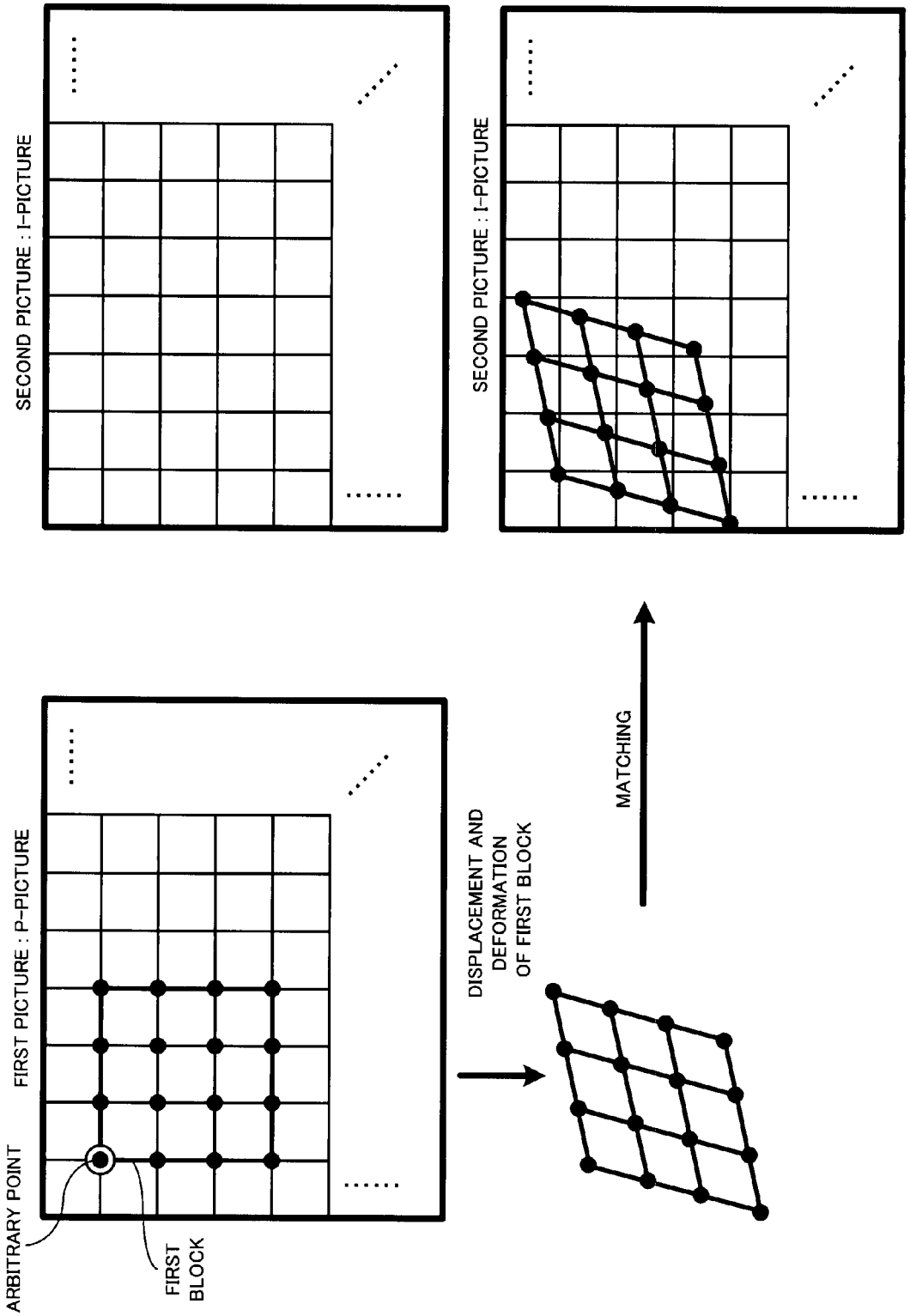
FIG. 8 shows the first block matching.

FIG. 8 shows the first block matching.

The predictive coding applies an MPEG. According to FIG. 8, a first block is selected for P-picture (first picture). Then, an arbitrary point is determined in the first picture. That is to say, depth distance Z of the arbitrary point and unit normal vector (nx, ny, nz) in the arbitrary point of surface of an object is determined. Firstly, the first block is moved by disparity vector based on relative position (tx, ty, 0) and depth distance Z. Then, the first picture coordinate (x, y) is considered to be an origin, and the first block is transformed by linear transformation matrix based on relative position (tx, ty, 0), depth distance Z, unit normal vector (nx, ny, nz) and the second picture coordinate (x', y'). Then, the first block is matched to the block of the I-picture in the second picture.

Figure 9:
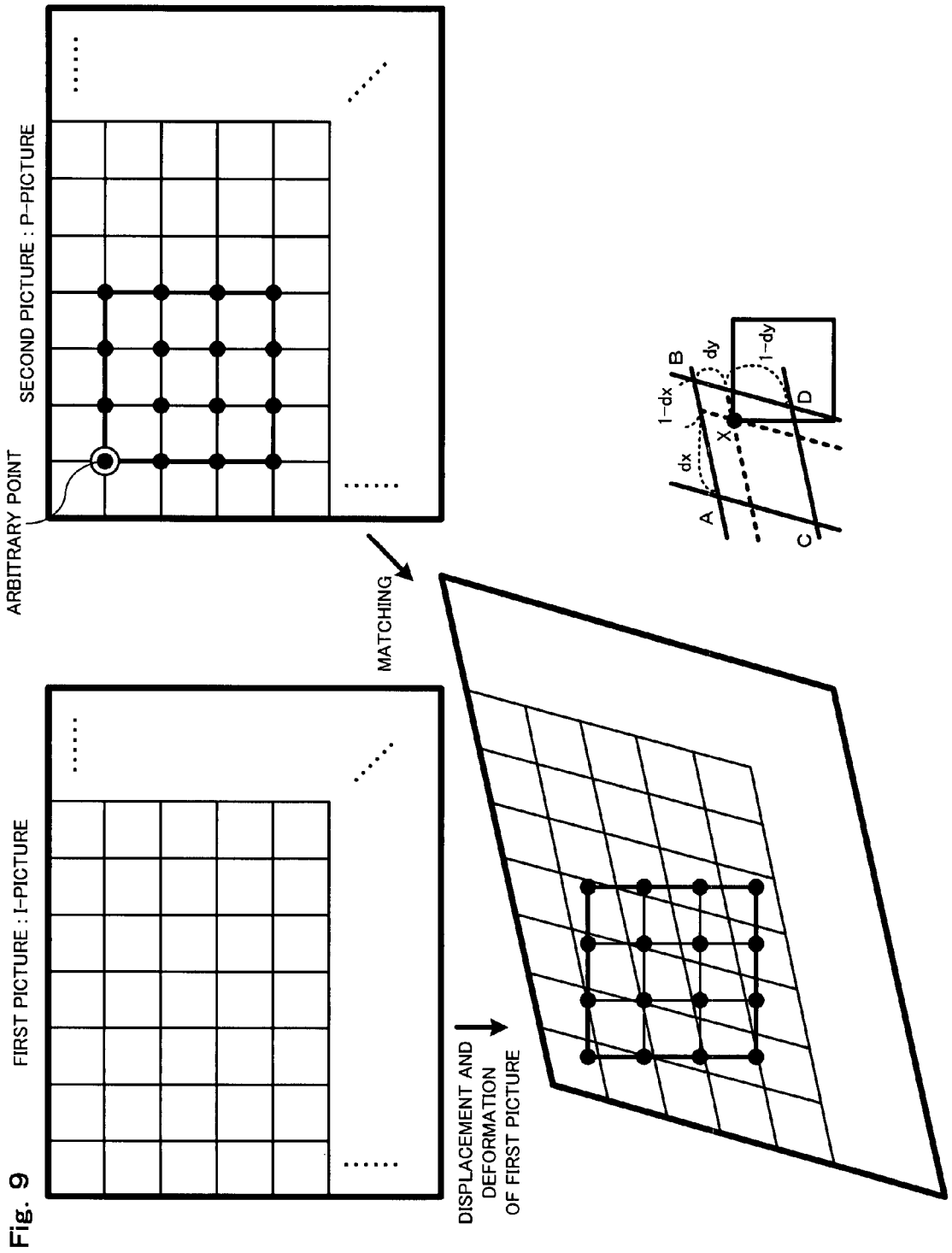
FIG. 9 shows the second block matching.

FIG. 9 shows the second block matching.

According to FIG. 9, the second block is selected for P-picture (second picture). Then, an arbitrary point is determined in the second block. That is to say, depth distance Z of the arbitrary point and a unit normal vector (nx, ny, nz) of the arbitrary point in the surface of the object is determined. Firstly, I-picture (the first picture) is moved by disparity vector based on relative position (tx, ty, 0) and depth distance Z. Then, the first picture coordinate (x, y) is considered to be an origin, and the first picture is transformed by linear transformation matrix based on relative position (tx, ty, 0), depth distance Z, unit normal vector (nx, ny, nz) and the second picture coordinate (x', y'). Then, the first picture is matched to the second block in the P-picture.

In the following, derivation process of the movement of a block or the picture, and of the linear transformation matrix for deformation is explained in detail.

First of all, internal parameter (internal camera matrix) "A" of camera is shown by the following formulas. "A" is known value.

$$A = \begin{pmatrix} fk_u & -fk_u \cot\theta & u_0 \\ 0 & \frac{fk_v}{\sin\theta} & v_0 \\ 0 & 0 & 1 \end{pmatrix}$$

fku, fkv: Focal distance (a number of pixels of the distance of the camera)

$\theta = \pi/2$: Angular degree of the coordinate axis u0, v0: picture-center

The camera coordinate system of camera C is moved (relative position t), and the camera coordinate system of camera C' is provided. "t" is one of outside parameters of the cameras. "t" shows a displacement vector of camera C' to the camera coordinate system of camera C. Camera C and C' are placed so that optical axes thereof becomes parallel. Also, camera C and C' are placed on the same plane which is vertical to the optical axis. Therefore, according to relative position vector t of camera C' for the camera coordinate system of camera C, the z-axis component becomes zero (tZ=0).

$$t = \begin{pmatrix} t_x \\ t_y \\ 0 \end{pmatrix}$$

The following relation is formed between a camera coordinate system coordinate of camera C and a camera coordinate system coordinate of camera C'. That is to say, the camera coordinate system coordinate of camera C is translated into the camera coordinate system coordinate of camera C' through outside parameters of camera.

$$M = M' + t \quad \text{(formula 1)}$$

M: Camera coordinate system coordinate of arbitrary point P of the object in camera C M': Camera coordinate system coordinate of arbitrary point P of the object in camera C'

Here, according to the camera coordinate system of camera C', the following formula is formed for the approximate plane of the object.

$$nT \cdot M' = d$$

n (|n|=1): A normal vector of plane in the camera coordinate system of camera C' d: The distance from the origin of the camera coordinate system of camera C' to the plane in the object $$n = \begin{pmatrix} n_x \\ n_y \\ n_z \end{pmatrix}$$

Thus, the following formula is formed.

$$nT/M' = d$$

$$nT/M'/d = 1 \quad \text{(formula 2)}$$

When formula (2) is substituted for formula (1), the following formula is formed.

$$M = M' + t \cdot \frac{n^T M'}{d} = \left( I + \frac{tn^T}{d} \right) M'$$

$$I + \frac{tn^T}{d} = \begin{pmatrix} 1 & 0 & 0 \\ 0 & 1 & 0 \\ 0 & 0 & 1 \end{pmatrix} + \frac{\begin{pmatrix} t_x \\ t_y \\ 0 \end{pmatrix} (n_x\ n_y\ n_z)}{d} = \begin{pmatrix} \frac{t_x n_x}{d}+1 & \frac{t_x n_y}{d} & \frac{t_x n_z}{d} \\ \frac{t_y n_x}{d} & \frac{t_y n_y}{d}+1 & \frac{t_y n_z}{d} \\ 0 & 0 & 1 \end{pmatrix}$$

Then, a digital image coordinate of arbitrary point P is defined as follows.

m: Digital image coordinate of arbitrary point P in camera C m': Digital image coordinate of arbitrary point P in camera C'

$$m = \begin{pmatrix} u \\ v \end{pmatrix} \quad \left( \tilde{m} = \begin{pmatrix} u \\ v \\ l \end{pmatrix} \right)$$

$$m' = \begin{pmatrix} u' \\ v' \end{pmatrix} \quad \left( \tilde{m}' = \begin{pmatrix} u' \\ v' \\ l \end{pmatrix} \right)$$

Also, normalized image coordinate of arbitrary point P is defined as follows. "Normalization picture" means a picture shot by a camera (normalization camera) located in unit length distance from the focal point. The coordinate of the arbitrary point in the normalization picture is called "normalized image coordinate".

x: Normalized image coordinate in camera C of arbitrary point P x': Normalized image coordinate in camera C' of arbitrary point P $$x = \begin{pmatrix} x \\ y \end{pmatrix} \quad \left( \tilde{x} = \begin{pmatrix} x \\ y \\ l \end{pmatrix} = A^{-1} \tilde{m} \right)$$

$$x' = \begin{pmatrix} x' \\ y' \end{pmatrix} \quad \left( \tilde{x}' = \begin{pmatrix} x' \\ y' \\ l \end{pmatrix} = A^{-1} \tilde{m}' \right)$$

Here, it is assumed that the camera coordinate system coordinate M and M' were exchanged with normalized image coordinate x and x'. In this case, the following transformation is formed. "s" is a scalar.

$$s\tilde{x} = \left( I + \frac{tn^T}{d} \right) \tilde{x}' \quad \text{FORMULA (3)}$$

$$s \begin{pmatrix} x \\ y \\ l \end{pmatrix} = \begin{pmatrix} \frac{t_x n_x}{d}+1 & \frac{t_x n_y}{d} & \frac{t_x n_z}{d} \\ \frac{t_y n_x}{d} & \frac{t_y n_y}{d}+1 & \frac{t_y n_z}{d} \\ 0 & 0 & 1 \end{pmatrix} \begin{pmatrix} x' \\ y' \\ l \end{pmatrix}$$

Further, in a case using digital image coordinate m and m', the following transformation is formed.

$$s\tilde{m} = A\left(I + \frac{m^T}{d}\right)A^{-1}\tilde{m}'$$

$$s\begin{pmatrix} u \\ v \\ 1 \end{pmatrix} = \begin{pmatrix} fk_u & -fk_u\cot\theta & u_0 \\ 0 & \frac{fk_v}{\sin\theta} & v_0 \\ 0 & 0 & 1 \end{pmatrix}$$

$$\begin{pmatrix} \frac{t_x n_x}{d}+1 & \frac{t_x n_y}{d} & \frac{t_x n_z}{d} \\ \frac{t_y n_x}{d} & \frac{t_y n_y}{d}+1 & \frac{t_y n_z}{d} \\ 0 & 0 & 1 \end{pmatrix} \begin{pmatrix} \frac{1}{fk_u} & \frac{\cos\theta}{fk_v} & -\frac{v_0\cos\theta}{fk_v} - \frac{u_0}{fk_u} \\ 0 & \frac{\sin\theta}{fk_v} & -\frac{v_0\sin\theta}{fk_v} \\ 0 & 0 & 1 \end{pmatrix} \begin{pmatrix} u' \\ v' \\ 1 \end{pmatrix}$$

When "t" is substituted by the above-mentioned formula (3), it is shown by two-dimensional affine transformation as follows.

$$s\begin{pmatrix} x \\ y \\ 1 \end{pmatrix} = \begin{pmatrix} \frac{t_x n_x}{d}+1 & \frac{t_x n_y}{d} & \frac{t_x n_z}{d} \\ \frac{t_y n_x}{d} & \frac{t_y n_y}{d}+1 & \frac{t_y n_z}{d} \\ 0 & 0 & 1 \end{pmatrix}\begin{pmatrix} x' \\ y' \\ 1 \end{pmatrix} \quad \text{FORMULA (4)}$$

$$\therefore \begin{pmatrix} x \\ y \\ 1 \end{pmatrix} = \begin{pmatrix} \frac{t_x n_x}{d}+1 & \frac{t_x n_y}{d} & \frac{t_x n_z}{d} \\ \frac{t_y n_x}{d} & \frac{t_y n_y}{d}+1 & \frac{t_y n_z}{d} \\ 0 & 0 & 1 \end{pmatrix}\begin{pmatrix} x' \\ y' \\ 1 \end{pmatrix}$$

For disparity vector D in the normalized image coordinate system, the following formula is formed.

$$D = \begin{pmatrix} x' - x \\ y' - y \end{pmatrix}$$

$$= \begin{pmatrix} x' - \left(\left(\frac{t_x n_x}{d}+1\right)x' + \frac{t_x n_y}{d}y' + \frac{t_x n_z}{d}\right) \\ y' - \left(\frac{t_y n_x}{d}x' + \left(\frac{t_y n_y}{d}+1\right)y' + \frac{t_y n_z}{d}\right) \end{pmatrix}$$

$$= \begin{pmatrix} -\frac{t_x n_x}{d}x' - \frac{t_x n_y}{d}y' - \frac{t_x n_z}{d} \\ -\frac{t_y n_x}{d}x' - \frac{t_y n_y}{d}y' - \frac{t_y n_z}{d} \end{pmatrix}$$

$$= -\frac{n_x x' + n_y y' + n_z}{d}\begin{pmatrix} t_x \\ t_y \end{pmatrix}$$

On the other hand, according to FIG. 7, the following formula is formed for depth distance Z of arbitrary point P.

$$D = \begin{pmatrix} -\frac{t_x}{Z} \\ -\frac{t_y}{Z} \end{pmatrix} = -\frac{1}{Z}\begin{pmatrix} t_x \\ t_y \end{pmatrix}$$

Thus, the following formula is formed.

$$-\frac{n_x x' + n_y y' + n_z}{d}\begin{pmatrix} t_x \\ t_y \end{pmatrix} = -\frac{1}{Z}\begin{pmatrix} t_x \\ t_y \end{pmatrix}$$

$$\therefore d = Z(n_x x' + n_y y' + n_z)$$

When this was substituted for formula (4), formulas (5) is formed as follows.

$$\begin{pmatrix} x \\ y \\ 1 \end{pmatrix} = \quad \text{FORMULA (5)}$$

$$\begin{pmatrix} \frac{t_x n_x}{Z(n_x x' + n_y y' + n_z)}+1 & \frac{t_x n_y}{Z(n_x x' + n_y y' + n_z)} & \frac{t_x n_z}{Z(n_x x' + n_y y' + n_z)} \\ \frac{t_y n_x}{Z(n_x x' + n_y y' + n_z)} & \frac{t_y n_y}{Z(n_x x' + n_y y' + n_z)}+1 & \frac{t_y n_z}{Z(n_x x' + n_y y' + n_z)} \\ 0 & 0 & 1 \end{pmatrix}$$

$$\begin{pmatrix} x' \\ y' \\ 1 \end{pmatrix}$$

IN CASE THAT POINT $$\begin{pmatrix} x' + \Delta x' \\ y' + \Delta y' \end{pmatrix} \text{OF} \begin{pmatrix} x' \\ y' \end{pmatrix}$$

NEIGHBORHOOD MOVE TO POINT $$\begin{pmatrix} x + \Delta x \\ y + \Delta y \end{pmatrix} \text{OF} \begin{pmatrix} x \\ y \end{pmatrix}$$

NEIGHBORHOOD $$\begin{pmatrix} x+\Delta x \\ y+\Delta y \\ 1 \end{pmatrix} =$$

$$\begin{pmatrix} \frac{t_x n_x}{Z(n_x x' + n_y y' + n_z)} + 1 & \frac{t_x n_y}{Z(n_x x' + n_y y' + n_z)} & \frac{t_x n_z}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 & \frac{t_y n_z}{Z(n_x x' + n_y y' + n_z)} \\ 0 & 0 & 1 \end{pmatrix}$$

$$\begin{pmatrix} x'+\Delta x' \\ y'+\Delta y' \\ 1 \end{pmatrix}$$

When difference for formula (5) is calculated, the following formula is formed.

$$\begin{pmatrix} \Delta x \\ \Delta y \end{pmatrix} = \begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix} \begin{pmatrix} \Delta x' \\ \Delta y' \end{pmatrix}$$

The second block of the second picture is moved based on following D in the first picture. Then, the first picture coordinate (x, y) is considered to be an origin, and the second block transforms by linear transformation matrix of L as follows. Thereby, the block of the first picture which is most similar to the second block is searched for. According to the linear transformation matrix, a block is transformed based on disparity vector and the inclination of surface (approximated in flat) of the object, and block matching is executed.

$$D = \begin{pmatrix} -\frac{t_x}{Z} \\ -\frac{t_y}{Z} \end{pmatrix}$$

$$L = \begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix}$$

Based on FIG. 9, a compression coding method of I-picture and P-picture are explained as follows.

First of all, P-picture is inter-frame prediction coded. Then, I-picture is split into a plurality of blocks. Then, the first picture coordinate (x, y) is considered to be an origin, and each block is transformed based on the above-mentioned disparity vector D and linear transformation matrix L. And, a block (reference block) of the I-picture that minimizes prediction error is derived. Then, disparity vector D and linear transformation matrix L are derived. That is to say, depth distance Z and unit normal vector (nx, ny, nz) are derived. Here, the block is compared with transformed reference block, and a prediction error is calculated. To realize this, linear interpolation is executed to transformed reference block. Also, for the comparison of each picture element of the block, a pixel value is calculated. For example, when linear interpolation is used, the pixel value of point X in FIG. 9 is calculated from the following formula by using pixel values of four surrounding points (A, B, C, D).

$$X=(1-dx)(1-dy)A+dx(1-dy)B+(1-dy)dyC+dxdyD$$

Finally, a prediction error is compression coded. Depth distance Z (or disparity vector D) and a unit normal vector (nx, ny, nz) are coded. Then, it codes by referring to depth distance Z and the unit normal vector (nx, ny, nz) of the adjacent block which already coded. Thereby, coding efficiency is improved. That is because disparity vector D or linear transformation matrix L in adjacent blocks takes equivalence or resemblance value.

Here, there are first compression efficiency that coded a prediction error based on the reference block of first picture and second compression efficiency that coded a prediction error by inter-frame prediction in second picture. When the second compression efficiency is higher than the first compression efficiency, inter-frame prediction coding is done in the second picture.

In the following, specific numeric value is substituted to the previously described formula.

f=810.8 (the number of pixels of focal distance of camera)
ku=kv=1.0 (CCD cell of the recent camera is a square)
θ=π/2 (CCD cell of the recent camera is a square)
u0=319.5 (in case the width of the picture is 640 pixel)
v0=239.5 (in case the height of the picture is 480 pixel)

$$A = \begin{pmatrix} 810.8 & 0 & 319.5 \\ 0 & 810.8 & 239.5 \\ 0 & 0 & 1 \end{pmatrix}$$

Relative position vector t assumes the following value.

$$t = \begin{pmatrix} 1.727 \\ 0.000 \\ 0.000 \end{pmatrix}$$

The digital image coordinate of point M0 in the picture of camera C is as follows.

$$m_0 = \begin{pmatrix} 571 \\ 257 \end{pmatrix}$$

The search is performed by using the block (for example, 4 by 4) which assumes point M0 the left top. Here, it is converted into normalized image coordinate. Normalized image coordinate x0 of point M0 is as follows.

$$x_0 = \begin{pmatrix} 0.310 \\ 0.022 \end{pmatrix}$$

According to the present invention, depth distance Z, normal vector nx and ny are changed arbitrarily, and block matching is executed.

IN CASE THAT $$Z = 21.875$$

$$n = \begin{pmatrix} -0.932 \\ 0.000 \\ 0.363 \end{pmatrix} \text{CORRESPONDS TO VECTOR}$$

FORMULA (6)

WHICH TURNED THE Z-AXIS ABOUT 69° IN THE Y-AXIS CIRCUMFERENCE $$D = -\frac{1}{Z}\begin{pmatrix} t_x \\ t_y \end{pmatrix} = -\frac{1}{21.875}\begin{pmatrix} 1.727 \\ 0.000 \end{pmatrix} = \begin{pmatrix} -0.079 \\ 0.000 \end{pmatrix}$$

ACCORDING TO DIGITAL PICTURE COORDINATE SYSTEM,

CORRESPOND TO DISPARITY $\Delta m = \begin{pmatrix} -64 \\ 0 \end{pmatrix}$ $$x'_0 = x_0 + D = \begin{pmatrix} 0.310 \\ 0.022 \end{pmatrix} + \begin{pmatrix} -0.079 \\ 0.000 \end{pmatrix} = \begin{pmatrix} 0.231 \\ 0.022 \end{pmatrix}$$

ACCORDING TO DIGITAL PICTURE COORDINATE SYSTEM,

CORRESPOND TO $m'_0 = m_0 + \Delta m$

FORMULA (7)

$$= \begin{pmatrix} 571 \\ 257 \end{pmatrix} + \begin{pmatrix} -64 \\ 0 \end{pmatrix} = \begin{pmatrix} 507 \\ 257 \end{pmatrix}$$

$$d = Z(n_x x' + n_y y' + n_z)$$
$$= 21.875 \cdot ((-0.932) \cdot 0.231 + 0.000 \cdot 0.022 + 0.363)$$
$$= 3.238$$

$$L = \begin{pmatrix} \frac{t_x n_x}{d} + 1 & \frac{t_x n_y}{d} \\ \frac{t_y n_x}{d} & \frac{t_y n_y}{d} + 1 \end{pmatrix}$$

$$= \begin{pmatrix} \frac{1.727 \cdot (-0.932)}{3.238} + 1 & \frac{1.727 \cdot 0.000}{3.238} \\ \frac{0.000 \cdot (-0.932)}{3.238} & \frac{0.000 \cdot 0.000}{3.238} + 1 \end{pmatrix}$$

$$= \begin{pmatrix} 0.500 & 0.000 \\ 0.000 & 1.000 \end{pmatrix}$$

The block is moved from coordinate x0 to disparity vector D. Block matching is executed by linear transformation L within the position. Point M0 corresponds to point M0', by displacement $\Delta m$ and linear transformation L.

For example, point M' of the right bottom of 4*4 blocks in the digital image coordinate of center point M0' corresponds to the following point M.

Center point M0': normalized image coordinate x0', digital image coordinate m0'

Point M': normalized image coordinate x', digital image coordinate m'

Point M: normalized image coordinate x, digital image coordinate m $$x = L(x' - x'_0) + x_0$$

$$= \begin{pmatrix} 0.500 & 0.000 \\ 0.000 & 1.000 \end{pmatrix}\begin{pmatrix} 0.005 \\ 0.005 \end{pmatrix} + \begin{pmatrix} 0.310 \\ 0.022 \end{pmatrix}$$

$$= \begin{pmatrix} 0.313 \\ 0.027 \end{pmatrix}$$

In the case of digital image coordinate system, the above-mentioned formula is equivalent to the following formulas.

$$m = L(m' - m'_0) + m_0$$

$$= \begin{pmatrix} 0.500 & 0.000 \\ 0.000 & 1.000 \end{pmatrix}\begin{pmatrix} 4 \\ 4 \end{pmatrix} + \begin{pmatrix} 571 \\ 257 \end{pmatrix}$$

$$= \begin{pmatrix} 573 \\ 261 \end{pmatrix}$$

If similarity of the matching of this case is the highest, the disparity vector and the linear transformation matrix correspond to formula (6) and formula (7).

$$D = \begin{pmatrix} -0.079 \\ 0.000 \end{pmatrix} \text{ACCORDING TO}$$

DIGITAL PICTURE COORDINATE SYSTEM,

CORRESPOND TO DISPARITY $\Delta m = \begin{pmatrix} -64 \\ 0 \end{pmatrix}$ $$L = \begin{pmatrix} 0.500 & 0.000 \\ 0.000 & 1.000 \end{pmatrix}$$

Then, a prediction error of both blocks is calculated.
The difference of pixel values calculated as follows is coded as a prediction error.

POINT $M_0\begin{pmatrix} 571 \\ 257 \end{pmatrix}$ CORRESPONDS TO $M'_0\begin{pmatrix} 507 \\ 257 \end{pmatrix}$ POINT $M\begin{pmatrix} 573 \\ 261 \end{pmatrix}$ CORRESPONDS TO $M'\begin{pmatrix} 511 \\ 261 \end{pmatrix}$

FOR EXAMPLE,

POINT $\begin{pmatrix} 571.5 \\ 258 \end{pmatrix}$ CORRESPONDS TO $\begin{pmatrix} 508 \\ 258 \end{pmatrix}$

PIXEL VALUE COMPARED TO $\begin{pmatrix} 508 \\ 258 \end{pmatrix}$ IS CALCULATED AS FOLLOWS.

$Y\begin{pmatrix} u \\ v \end{pmatrix}$ ASSUMES PIXEL VALUE OF $\begin{pmatrix} u \\ v \end{pmatrix}$ $$Y\begin{pmatrix} 571.5 \\ 258 \end{pmatrix} = (1 - 0.5)(1 - 0.0)Y\begin{pmatrix} 571 \\ 258 \end{pmatrix} +$$

$$0.5(1 - 0.0)Y\begin{pmatrix} 572 \\ 258 \end{pmatrix} + (1 - 0.5)0.0Y\begin{pmatrix} 571 \\ 257 \end{pmatrix} + 0.5 \cdot 0.0Y\begin{pmatrix} 572 \\ 257 \end{pmatrix}$$

Figure 10:
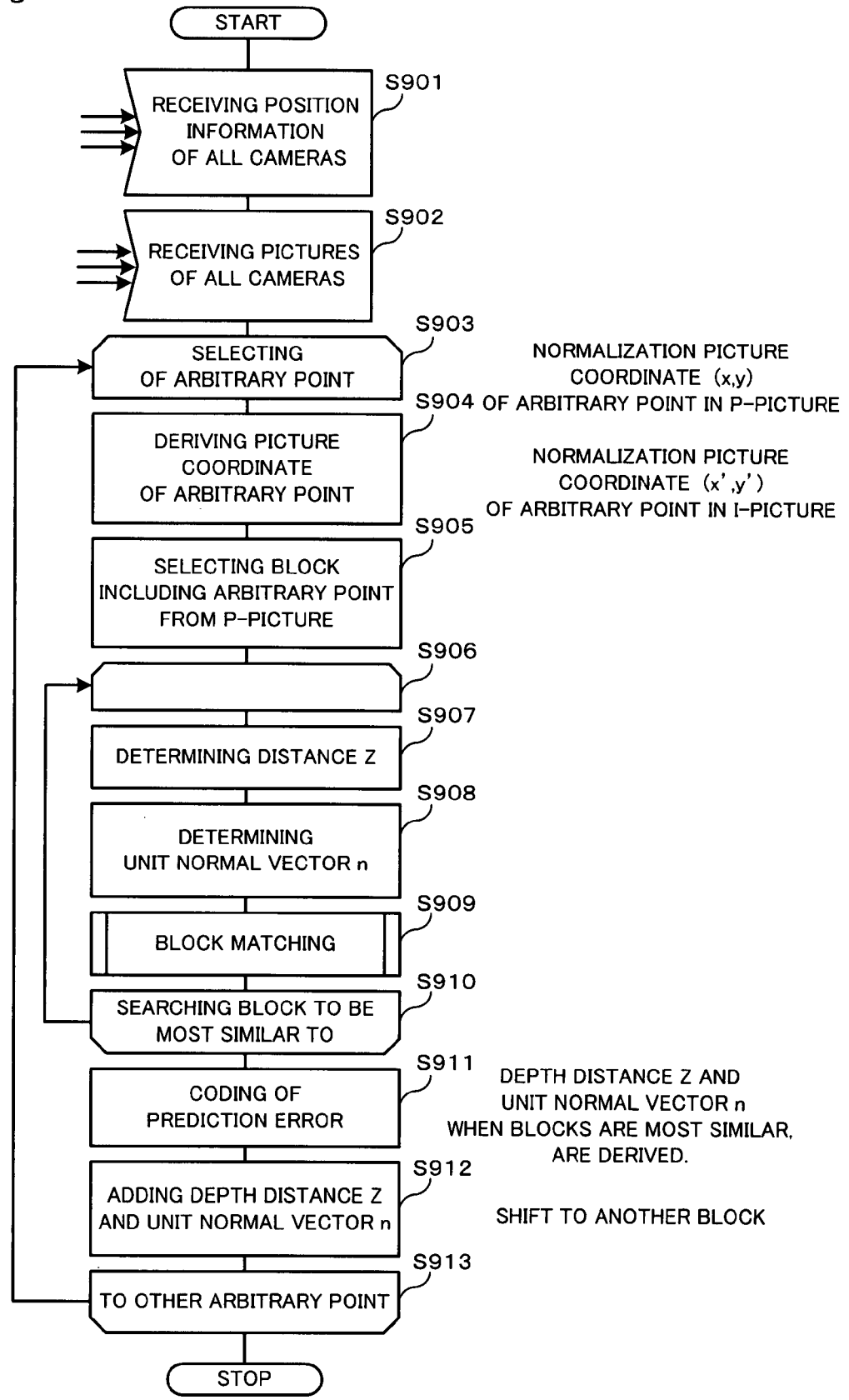
FIG. 10 shows a flowchart of the present invention.

FIG. 10 shows a flowchart of the present invention. Further, FIG. 10 is explained in each steps below, based on the matching in FIG. 8.

(S901) Position information of all cameras is obtained.

All cameras are placed so that those optical axes become parallel. Also, all cameras are placed on the same plane which is vertical in the optical axis. Thus, relative position (tx, ty, 0) of the world coordinate system of second camera to first camera is obtained. The camera may be movable. In case the camera has positioning functions such as GPS (Global Positioning System), the camera can obtain the position information. Further, in case that the position of the camera does not change, the position information of the camera is determined previously.

(S902) Pictures of all cameras are obtained. Here, optical axes of first camera and/or second camera may not be parallel to the Z-axis. In this case, first of all, camera coordinate system coordinates are converted so that these optical axes of the first camera and the second camera become parallel to the Z-axis. To realize this, by using camera internal parameters, camera coordinate system coordinates of the first camera and the second camera are converted.

(S903) An arbitrary point on the object is determined.

(S904) First picture coordinate (x, y) obtained by projecting the arbitrary point in P-picture, and second picture coordinate (x', y') obtained by projecting the arbitrary point in I-picture, are derived.

Here, picture coordinate of the arbitrary point is normalized image coordinate.

(S905) First block including the arbitrary point is selected for P-picture.

(S906) S907-S910 is repeated as follows.

(S907) Depth distance Z of the arbitrary point is determined.

(S908) Unit normal vector (nx, ny, nz) of the arbitrary point in the surface of the object is determined.

(S909) The first block is moved by disparity vector based on relative position (tx, ty, 0) and depth distance Z. Further, the first picture coordinate (x, y) is assumed as origin, and the first block is transformed by linear transformation matrix based on relative position (tx, ty, 0), depth distance Z, unit normal vector (nx, ny, nz) and the second picture coordinate (x', y'). Then, the first block is matched to the block of the I-picture. Here, the disparity vector is as follows.

$$\begin{pmatrix} -\frac{t_x}{Z} \\ -\frac{t_y}{Z} \end{pmatrix}$$

The linear transformation matrix is as follows.

$$\begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix}$$

(S910) While changing depth distance Z and a unit normal vector (nx, ny, nz) arbitrarily, S906-S909 is repeated. And, the second block of the second picture which is most similar to the first block of the moved and transformed first picture is searched for. As a result, depth distance Z and unit normal vector (nx, ny, nz) are derived.

(S911) A prediction error between the moved and deformed first block of P-picture and the second block of the I-picture which is most similar to the first block is derived. Then, the prediction error is coded. The coding method of the prediction error is generally based on MPEG.

(S912) Depth distance Z and a unit normal vector (nx, ny, nz) are added to coded data.

(S913) Further, for part except the first block in the P-picture, arbitrary point on the object is determined. Then, S903-S912 is repeated.

Figure 11:
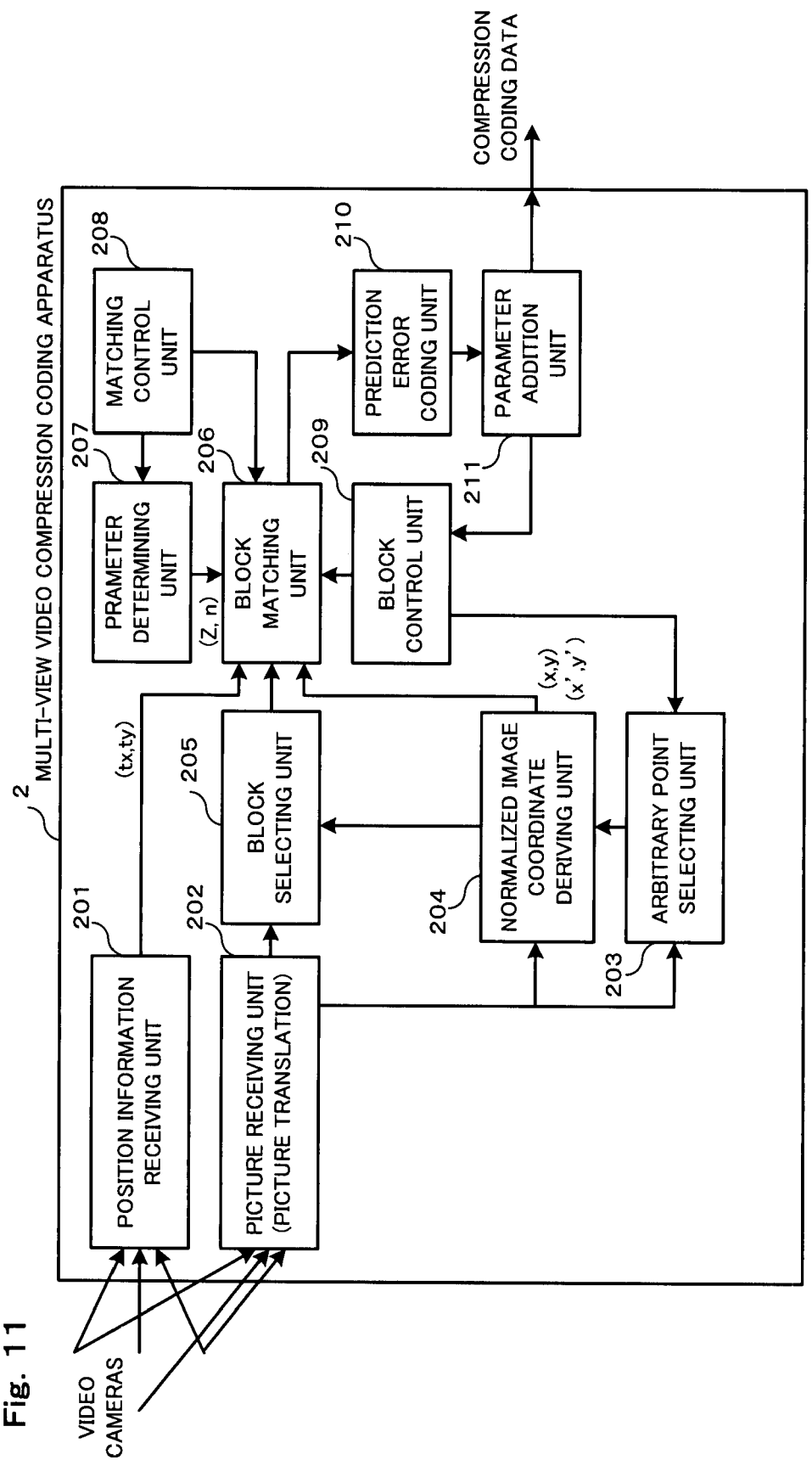
FIG. 11 shows a functional configuration diagram of the multi-view video compression coding apparatus of the present invention.

FIG. 11 shows the functional configuration diagram of the multi-view video compression coding apparatus of the present invention.

According to FIG. 11, multi-view video compression coding apparatus 2 has a position information receiving unit 21, a picture receiving unit 22, an arbitrary point selecting unit 203, a normalized image coordinate deriving unit 204, a block selecting unit 205, a block matching unit 206, a parameter determining unit 207, a matching control unit 208, a block control unit 209, a prediction error coding unit 210 and parameter addition unit 211. These function units can be realized by a program to be executed with a computer.

Position information receiving unit 21 receives position information of all cameras. This has a same function as S901 in FIG. 9 mentioned above.

Picture receiving unit 22 receives synchronized pictures from all cameras. This has a same function as S902 in FIG. 9 mentioned above. Arbitrary point selecting unit 203 determines arbitrary point on the object.

Arbitrary point selecting unit 203 determines the arbitrary point on the object. Arbitrary point selecting unit 203 corresponds to the indication from block control unit 209. Arbitrary point selecting unit 203 further determines an arbitrary point on the object, for part except the first block of the first picture. This has a same function as S903 in FIG. 9 mentioned above.

Normalized image coordinate deriving unit 204 derives a first normalized image coordinate (x, y) obtained by projecting the arbitrary point to the first picture, and a second normalized image coordinate (x', y') obtained by projecting the arbitrary point to the second picture. This has a function like above-mentioned S904 in FIG. 9.

Block selecting unit 205 selects the first block including the arbitrary point for the first picture. This has a same function as S905 in FIG. 9 mentioned above.

Block matching unit 206 moves the first block in disparity vector based on relative position (tx, ty, 0) and depth distance Z. Then, the first picture coordinate (x, y) is assumed as origin, and the first block is transformed in linear transformation matrix based on relative position (tx, ty, 0), depth distance Z, a unit normal vector (nx, ny, nz) and the second picture coordinate (x', y'). Then, the first block is matched to the block of the second picture. This has a same function as S909 in FIG. 9 mentioned above.

Further, when block selecting unit 205 selects a second block including the arbitrary point for the second picture, block matching unit 206 moves the first picture in disparity vector. Then, the first picture coordinate (x, y) is assumed as origin, and the first picture is transformed in linear transformation matrix. Then the first picture is matched to the second block of the second picture.

Parameter determining unit 207 determines depth distance Z of the arbitrary point, and unit normal vector (nx, ny, nz) of arbitrary point in the surface of the object. This has a same function as S907 and S908 in FIG. 9 mentioned above.

While matching control unit 208 changes depth distance Z and unit normal vector (nx, ny, nz) arbitrarily, parameter decision unit 207 and block matching unit 206 are repeated. Then, the second block of the second picture which is the most similar to the moved and deformed first block of the first picture is searched for. And depth distance Z and a unit normal vector (nx, ny, nz) are derived. This has a same function as S906 and S910 in FIG. 9 mentioned above.

Block control unit 209 repeats normalized image coordinate calculating unit 204, parameter determining unit 207, block matching unit 206, matching control unit 208, and prediction error coding unit 210 and parameter addition unit 211, for arbitrary point. Finally, all parts of the first picture and the second picture are compression coded. This has a same function as S903 and S911 in FIG. 9 mentioned above.

Prediction error coding unit 210 derives a prediction error between the moved and deformed first block of the first picture and the second block of the second picture which is the most similar to the first block. Then the prediction error is coded. This has a same function as S911 in FIG. 9 mentioned above.

Parameter addition unit 211 adds the derived depth distance Z and the unit normal vector (nx, ny, nz) to coded data. This has a same function as S912 of FIG. 9 mentioned above.

According to the multi-view video compression coding method and apparatus of the present invention, complete block matching is enabled even if the surface of the object inclines to optical axes of cameras. A disparity vector is detected by block matching, and multi-viewpoint images are compression coded by using the disparity vector. According to the block matching based on MPEG, first block of the P-picture or I-picture itself are moved and transformed, based on arbitrary depth distance Z and arbitrary unit normal vector n for the surface of a object. Thereby, a linear transformation matrix is detected with a disparity vector. Also, the first picture coordinate is assumed as origin, and a block transformed based on the linear transformation matrix is derived. And a prediction error between these blocks is derived. Thereby, the data volume of the prediction error is reduced, and multi-viewpoint image is compression coded with high efficiency.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method for making a computer to function as multi-view video compression coding device, using first picture of an object shot by first camera and second picture of an object shot by second camera, the first camera and the second camera being placed so that those optical axes become parallel to the Z-axis and are in relative position (tx, ty, 0) on the XY plane, said method comprising:

first step of selecting an arbitrary point on the object, second step of deriving first picture coordinate (x, y) obtained by projecting the arbitrary point in the first picture, and second picture coordinate (x', y') obtained by projecting the arbitrary point in the second picture, third step of selecting first block including the arbitrary point for the first picture, fourth step of determining depth distance Z of the arbitrary point, and unit normal vector (nx, ny, nz) of the arbitrary point in the surface of the object, fifth step of moving the first block by disparity vector based on relative position (tx, ty, 0) and depth distance Z, assuming the first picture coordinate (x, y) as origin, transforming the first block by linear transformation matrix based on relative position (tx, ty, 0), depth distance Z, unit normal vector (nx, ny, nz) and the second picture coordinate (x', y'), then, matching the first block to block of the second picture, sixth step of repeating said fourth step and said fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), seventh step of deriving a prediction error between the moved and deformed first block of P-picture and the second block of the I-picture which is most similar to the first block, and then, coding the prediction error, and eighth step of adding the depth distance Z and the unit normal vector (nx, ny, nz) to coded data.

2. The method as claimed in claim 1, wherein the seventh step uses the prediction error coding system of MPEG, the first picture is P-picture, and the second picture is I-picture.

3. The method as claimed in claim 1, wherein the first step further selects an arbitrary point on the object for part except the first block in the first picture, and finally all parts of the first picture and the second picture are compression coded.

4. The method as claimed in claim 1, wherein for the first step, the picture coordinate of the arbitrary point is normalized image coordinate, for the fifth step, the disparity vector is as follows;

$$\begin{pmatrix} -\dfrac{t_x}{Z} \\ -\dfrac{t_y}{Z} \end{pmatrix}$$

and the linear transformation matrix is as follows;

$$\begin{pmatrix} \dfrac{t_x n_x}{Z(n_x x' + n_y y' + n_z)} + 1 & \dfrac{t_x n_y}{Z(n_x x' + n_y y' + n_z)} \\ \dfrac{t_y n_x}{Z(n_x x' + n_y y' + n_z)} & \dfrac{t_y n_y}{Z(n_x x' + n_y y' + n_z)} + 1 \end{pmatrix}$$

5. The method as claimed in claim 1, wherein the method precedes the first step in case optical axes of first camera and/or second camera may not be parallel to the Z-axis, said method having the step of converted camera coordinate system coordinates of the first camera and the second camera so that these optical axes of the first camera and the second camera become parallel to the Z-axis by using camera internal parameters.

6. multi-view video compression coding method for using first picture of an object shot by first camera and second picture of an object shot by second camera, the first camera and the second camera being placed so that those optical axes become parallel to the Z-axis and are in relative position (tx, ty, 0) on the XY plane, said method comprising:

first step of selecting an arbitrary point on the object, second step of deriving first picture coordinate (x, y) obtained by projecting the arbitrary point in the first picture, and second picture coordinate (x', y') obtained by projecting the arbitrary point in the second picture, third step of selecting second block including the arbitrary point for the second picture, fourth step of determining depth distance Z of the arbitrary point, and unit normal vector (nx, ny, nz) of the arbitrary point in the surface of the object, fifth step of moving the first picture by disparity vector based on relative position (tx, ty, 0) and depth distance Z, assuming the first picture coordinate (x, y) as origin, transforming the first picture by linear transformation matrix based on relative position (tx, ty, 0), depth distance Z, unit normal vector (nx, ny, nz) and the second picture coordinate (x', y'), then, matching the first picture to the second block of the second picture, sixth step of repeating said fourth step and said fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), seventh step of deriving a prediction error between the moved and deformed first block of P-picture and the second block of the I-picture which is most similar to the first block, and then, coding the prediction error, and eighth step of adding the depth distance Z and the unit normal vector (nx, ny, nz) to coded data.

7. The method as claimed in claim 6, wherein the seventh step uses the prediction error coding system of MPEG, the first picture is I-picture, and the second picture is P-picture.

8. The method as claimed in claim 6, wherein the first step further selects an arbitrary point on the object for part except the first block in the first picture, and finally all parts of the first picture and the second picture are compression coded.

9. The method as claimed in claim 6, wherein
for the first step, the picture coordinate of the arbitrary point is normalized image coordinate,
for the fifth step, the disparity vector is as follows;

$$\begin{pmatrix} -\frac{t_x}{Z} \\ -\frac{t_y}{Z} \end{pmatrix}$$

and the linear transformation matrix is as follows;

$$\begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix}$$

10. The method as claimed in claim 6, wherein the method precedes the first step in case in a case that optical axes of first camera and/or second camera may not be parallel to the Z-axis, said method having the step of converted camera coordinate system coordinates of the first camera and the second camera so that these optical axes of the first camera and the second camera become parallel to the Z-axis, by using camera internal parameters.

11. A multi-view video compression coding apparatus connected to a plurality of video cameras placed in different positions, using first picture of an object shot by first camera and second picture of an object shot by second camera, the first camera and the second camera being placed so that those optical axes become parallel to the Z-axis and are in relative position (tx, ty, 0) on the XY plane, said apparatus comprising:
first means for determining an arbitrary point on the object,
second means for deriving first picture coordinate (x, y) obtained by projecting the arbitrary point in the first picture, and second picture coordinate (x', y') obtained by projecting the arbitrary point in the second picture,
third means for selecting first block including the arbitrary point for the first picture,
fourth means for determining depth distance Z of the arbitrary point, and unit normal vector (nx, ny, nz) of the arbitrary point in the surface of the object,
fifth means for moving the first block by disparity vector based on relative position (tx, ty, 0) and depth distance Z, assuming the first picture coordinate (x, y) as origin, transforming the first block by linear transformation matrix based on relative position (tx, ty, 0), depth distance Z, unit normal vector (nx, ny, nz) and the second picture coordinate (x', y'), then, matching the first block to block of the second picture, sixth means for repeating said fourth step and said fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), seventh means for deriving a prediction error between the moved and deformed first block of P-picture and the second block of the I-picture which is most similar to the first block, and then, coding the prediction error, and eighth means for adding the depth distance Z and the unit normal vector (nx, ny, nz) to coded data.

12. The apparatus as claimed in claim 11, wherein the seventh means uses the prediction error coding system of MPEG, the first picture is P-picture, and the second picture is I-picture.

13. The apparatus as claimed in claim 11, wherein the first means further selects an arbitrary point on the object for part except the first block in the first picture,
said apparatus further has ninth means for repeating from first means to eighth means, and
finally all parts of the first picture and the second picture are compression coded.

14. The apparatus as claimed in claim 11, wherein
for the first means, the picture coordinate of the arbitrary point is normalized image coordinate,
for the fifth means, the disparity vector is as follows; and $$\begin{pmatrix} -\frac{t_x}{Z} \\ -\frac{t_y}{Z} \end{pmatrix}$$

the linear transformation matrix is as follows;

$$\begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix}$$

15. The apparatus as claimed in claim 11, wherein in a case that optical axes of first camera and/or second camera may not be parallel to the Z-axis, said apparatus has means for converting camera coordinate system coordinates of the first camera and the second camera so that these optical axes of the first camera and the second camera become parallel to the Z-axis, by using camera internal parameters.

16. A multi-view video compression coding apparatus connected to a plurality of video cameras placed in different positions, using first picture of an object shot by first camera and second picture of an object shot by second camera, the first camera and the second camera being placed so that those optical axes become parallel to the Z-axis and are in relative position (tx, ty, 0) on the XY plane, said apparatus comprising:
first means for selecting an arbitrary point on the object,
second means for deriving first picture coordinate (x, y) obtained by projecting the arbitrary point in the first picture, and second picture coordinate (x', y') obtained by projecting the arbitrary point in the second picture, third means for selecting second block including the arbitrary point for the second picture, fourth means for determining depth distance Z of the arbitrary point, and unit normal vector (nx, ny, nz) of the arbitrary point in the surface of the object, fifth means for moving the first picture by disparity vector based on relative position (tx, ty, 0) and depth distance Z, assuming the first picture coordinate (x, y) as origin, transforming the first picture by linear transformation matrix based on relative position (tx, ty, 0), depth distance Z, unit normal vector (nx, ny, nz) and the second picture coordinate (x', y'), then, matching the first picture to the second block of the second picture, sixth means for repeating said fourth step and said fifth step while changing the depth distance Z and the unit normal vector (nx, ny, nz) arbitrarily, searching for the second block of the second picture which is most similar to the first block of the moved and transformed first picture, and as a result, deriving depth distance Z and unit normal vector (nx, ny, nz), seventh means for deriving a prediction error between the moved and deformed first block of P-picture and the second block of the I-picture which is most similar to the first block, and then, coding the prediction error, and eighth means for adding the depth distance Z and the unit normal vector (nx, ny, nz) to coded data.

17. The apparatus as claimed in claim 16, wherein the seventh means uses the prediction error coding system of MPEG, the first picture is I-picture, and the second picture is P-picture.

18. The apparatus as claimed in claim 16, wherein the first means further selects an arbitrary point on the object for part except the first block in the first picture, said apparatus further has ninth means for repeating from first means to eighth means, and finally all parts of the first picture and the second picture are compression coded.

19. The apparatus as claimed in claim 16, wherein for the first means, the picture coordinate of the arbitrary point is normalized image coordinate, for the fifth means, the disparity vector is as follows; and $$\begin{pmatrix} -\frac{t_x}{Z} \\ -\frac{t_y}{Z} \end{pmatrix}$$

the linear transformation matrix is as follows;

$$\begin{pmatrix} \frac{t_x n_x}{Z(n_x x' + n_y y' + n_z)} + 1 & \frac{t_x n_y}{Z(n_x x' + n_y y' + n_z)} \\ \frac{t_y n_x}{Z(n_x x' + n_y y' + n_z)} & \frac{t_y n_y}{Z(n_x x' + n_y y' + n_z)} + 1 \end{pmatrix}$$

20. The apparatus as claimed in claim 16, wherein in a case that optical axes of first camera and/or second camera may not be parallel to the Z-axis, said apparatus has means for converting camera coordinate system coordinates of the first camera and the second camera so that these optical axes of the first camera and the second camera become parallel to the Z-axis, by using camera internal parameters.

* * * * *